United States Patent [19]

Hau-Chun Ku et al.

[11] 4,356,472

[45] Oct. 26, 1982

[54] CHARACTER RECOGNITION SYSTEM

[75] Inventors: Edward Hau-Chun Ku, Matthews; Gene D. Rohrer, Concord, both of N.C.

[73] Assignee: International Business Machines Corporation, Armonk, N.Y.

[21] Appl. No.: 163,672

[22] Filed: Jun. 27, 1980

[51] Int. Cl.³ .............................................. G06K 9/00
[52] U.S. Cl. ............................................. 340/146.3 C
[58] Field of Search ............. 340/146.3 AC, 146.3 C, 340/146.3 R; 235/449

[56] References Cited

U.S. PATENT DOCUMENTS 3,528,058  9/1970  Bond ........................... 340/146.3 C
3,535,682  10/1970  Dykaar et al. ............... 340/146.3 C
3,987,411  10/1976  Kruklitis et al. ............ 340/146.3 C
4,143,355  3/1979  MacIntyre .................... 340/146.3 C
4,277,776  7/1981  Nally et al. ................... 340/146.3 C Primary Examiner—Leo H. Boudreau
Attorney, Agent, or Firm—Paul M. Brannen

[57] ABSTRACT

A character recognition system including a timing subsystem, comprising a base oscillator or clock, and timing circuits driven by the base clock to provide a plurality of timing pulses for timing the operation of the entire system. The timing circuits are governed in part by delay circuits which are in turn controlled by the amplitude and location of peak signals derived from scanning earlier pulses.

3 Claims, 8 Drawing Figures

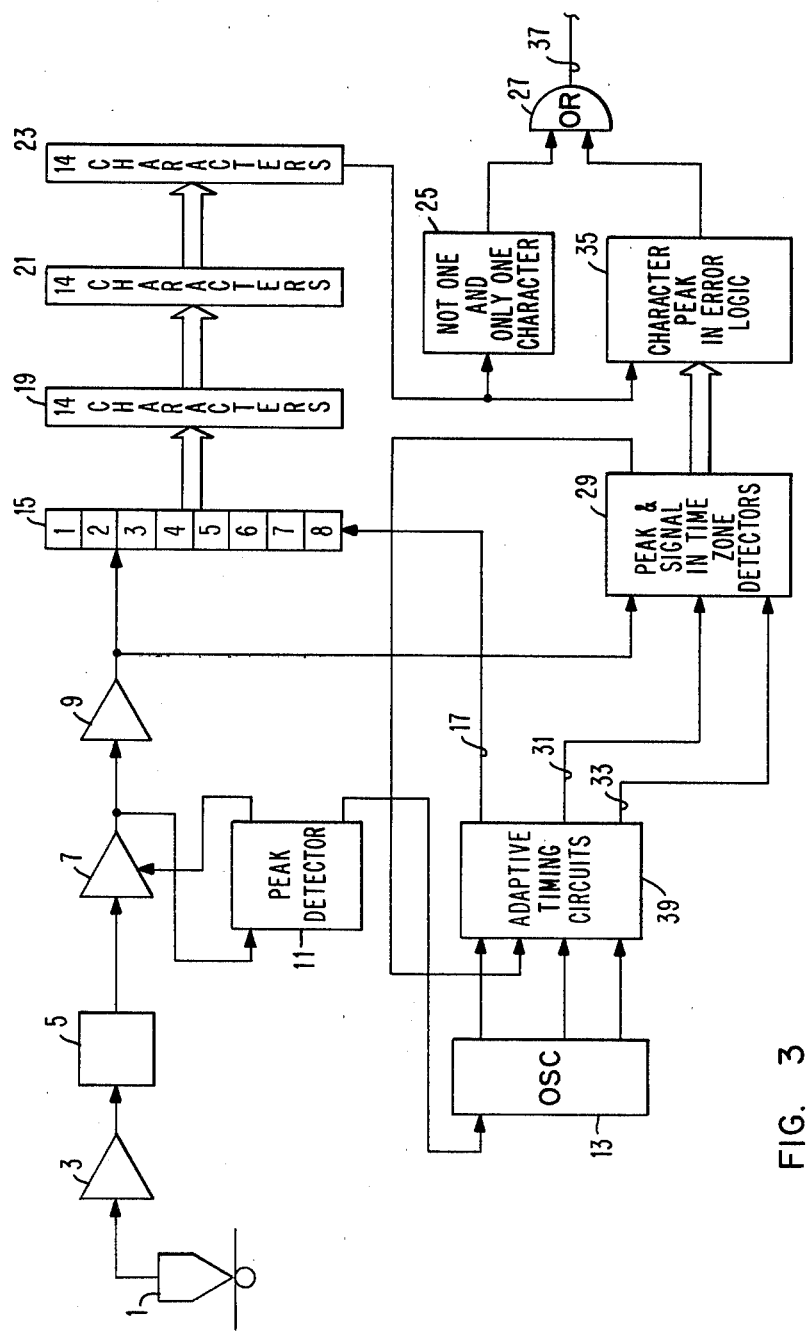

CHARACTER 6
SHADED AREA --
EDGE EMBOSSED

BASIC TIME ZONES WITH IDEAL SIGNAL
CHARACTER 6

DELAYED PEAK
TIME ZONES WITH ADT ADJUSTMENTS

CHARACTER RECOGNITION SYSTEM

BACKGROUND OF THE INVENTION

1. Field of the Invention

This invention relates to character recognition systems and particularly single gap magnetic ink character recognition systems utilizing an adaptive timing system. More particularly, the invention relates to an adaptive timing system which will compensate for printing defects in the characters to be recognized by the system.

2. Description of the Prior Art

There are a large number of prior art character recognition systems of the so-called "single gap" type. U.S. Pat. Nos. 3,119,980; 3,541,508; 3,629,829; 3,645,392; 3,879,707 and 4,148,010 are directed to systems of this type. They do not contemplate, however, a timing system which is adaptive to changes in the location of peaks in the analog signals used in the system.

SUMMARY OF THE INVENTION

It is accordingly a principal object of the present invention to provide an improved single gap character recognition system.

An object of this invention is to provide an improved system of the type described in which the operation of the system timing circuits is altered in accordance with the location of peaks in the input waveform.

Another object of this invention is to provide an improved character recognition system in which the timing of the system is adapted to compensate for faulty printing.

Yet another object of this invention is to provide an improved character recognition system in which the timing of the peak detection circuits is governed by the location of the next two previous peaks.

A further object of this invention is to provide an improved system of the type described in which the resetting time of the integrators used in the system is varied to compensate for printing imperfections.

Briefly described, a single gap character recognition system of a type well known in the art is provided with a subsystem of timing circuits which are governed by the location and amplitude of the next two previous peaks in the analog signals derived from scanning the character. The peak detecting circuitry governs the supply of signals from the basic system clock to a delay time-out counter, which in turn governs the resetting of time zero integrators which examine the integrated value of the signal in each of the plurality of time zones which divide or partition the input signal. Where necessary, an extended time zero integration is performed in order to be sure that a delayed peak signal will be properly detected. An inhibit delay trigger is also provided to distinguish a narrow line character. When conditions are met, this trigger will disable the adaptive timing for that character.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 3 is a schematic general block diagram of the system shown in FIG. 1, modified to use the adaptive timing system in accordance with the invention.

Similar reference characters refer to similar parts in each of the several views.

DESCRIPTION OF PREFERRED EMBODIMENT

Figure 1:
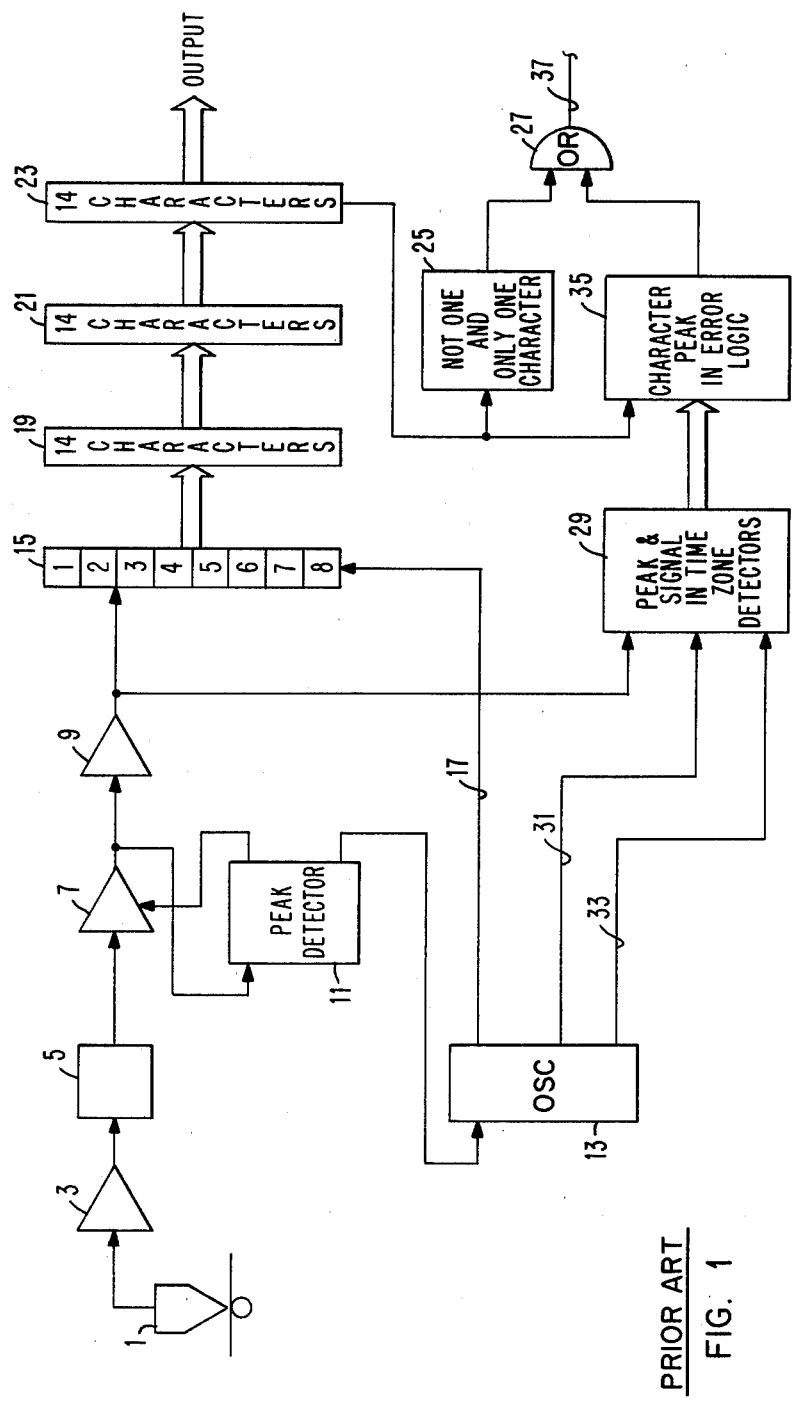
FIG. 1 is a schematic block diagram of a single-gap character recognition system of a type already known in the art.

Referring to FIG. 1, there is shown a schematic diagram of a single gap magnetic ink character reading system of the type already known in the art. Signals from magnetized characters are generated by passing a read head 1 across the character wherein the changes in the magnetic flux induce voltages in the head winding which are supplied to the input of a preamplifier 3, and then through a low pass filter 5, which serves to extract noise from the signal, to the input of a voltage controlled amplifier 7, the output of which is connected to the input of a power amplifier 9. The output of amplifier 7 is also supplied to the input of a peak detector circuit 11, which has one output connected back to the gain control input of amplifier 7. The other output of peak detector 11 is supplied as a timing control signal to the input of an oscillator 13, which supplies timing signals for the remainder of the system.

The output of amplifier 9 is connected to the inputs of a plurality of time zone integrators 15, in the present case 8 time zones being provided. The integrators are all reset by a common reset control signal supplied over a line 17 from the oscillator 13. The outputs of integrators 15 are supplied to the inputs of a plurality of correlation networks 19, one such correlation network being provided for each of the characters to be recognized, in this instance 14 characters. The 14 outputs of correlation networks 19 are supplied to the corresponding inputs of a plurality of maximum level detectors 21, also equal to the number of characters to be recognized, namely 14. The outputs of the maximum level detectors are supplied to a corresponding plurality of character latches 23, which store the output signals representing the character which has been read.

Fourteen output lines are provided from the character latches 23. Checking for proper operation of the system includes logic circuits for indicating whether or not there has been a correlation error, in which case there is an output generated by the logic block 25 designated "not 1 and only 1 character." This logic block will provide an output to an OR circuit 27, if the character latches 23 indicate that more than one character latch has been set, thereby indicating a conflict or uncertainty in the reading of the character. Additional circuitry is provided to indicate whether or not there has been an error in detecting the peaks in the character and this is provided by circuitry designated as peak and signal in time zone detectors 29, provided with inputs from the output of amplifier 9, and two signal lines 31 and 33 from the oscillator 13. Line 31 provides signals indicating sample time between time zones and line 33 provides signals indicating a sample during a time zone. The detectors 29 determine whether or not the signals occur at the proper intervals, and are translated by a logic block 35, designated as "character peak in error logic." This logic block provides an output to OR circuit 27 when an error occurs in detecting the peak or peaks in a character. The output of OR circuit 27 appears on a line 37 which when active indicates that a character error has occurred and therefore the output of the character latches 23 should not be utilized.

The foregoing describes the arrangement for a single gap magnetic ink charcter reader as already known in the art. This particular arrangement works very well on magnetic ink characters which have been printed within the rigid specifications set for such printing but some printing defects which can occur and are often found in the actual check environment can cause considerable rejects to occur in systems of the type just described. A large portion of the out-of-spec or inferior printing that causes rejects on systems of this type are those involving time displacement of the most important signal information points of the characters. Such printing defects are generally caused by embossing of the character edges, the nonuniformity of ink deposits, the character edge deficiencies and variations in character dimensions.

Figure 2:
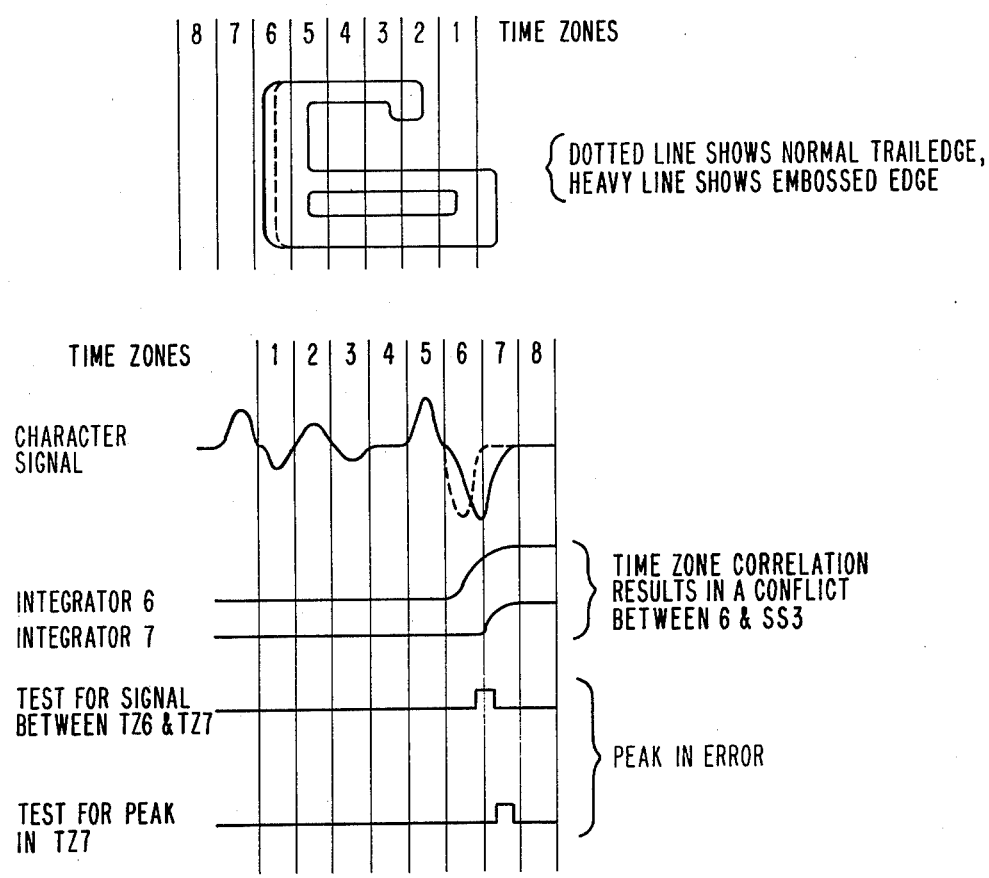
FIG. 2 is illustrative of waveforms encountered in the system of FIG. 1, when scanning a defective character.

Displacement of the prime signal points in the character wave forms affect the prior single gap recognition system in two different ways. First, it causes errors in the correlation networks utilized in the system and second, peaks are located at inappropriate areas within the character waveform. Both of these conditions are caused by the fact that the prior system sets time boundaries throughout the character analysis determined only by the location of the first positive peak of the character. An example of a printing defect causing an error in both the correlation circuitry and in the peak in error circuitry is shown in FIG. 2. In this instance, the character "6" shown at the top of the figure has a left hand border which comprises an embossed edge shown by the heavy line instead of the normal trailing edge indicated by the dotted vertical line. The character signal waveform resulting from the scanning of the character, as shown, provides an output as indicated in the topmost waveform shown in FIG. 2. The dotted waveform shown in zone 6 represents the normal waveform which would be seen if the character were properly formed, while the solid line shows the distorted portion of the waveform extending into zone 7 resulting from the heavy embossed edge. The next two waveforms show the intetrator signals for zones 6 and 7 and the resulting time zone correlation results in a conflict between the character "6" which is the correct character shown and a symbol "SS3" which is caused by the malformed portion of character 6. A test for a signal existing between time zone 6 and time zone 7 provides a peak in error signal at the boundary between lines 6 and 7 and also provides a peak in error signal for the peak in time zone 7 which should not exist.

In the present invention, the adaptive timing system corrects the timing boundary according to the information relating to peaks and wave amplitudes found in the previous two peaks. If a peak is detected late within the fixed time boundaries and the previous peak does not signify that the system is dealing with a narrow line, the following boundary is displaced in time. The time displacement is determined by absolute location of the previous peak and is controlled to make the peak appear as if located in the center of the time zone. Following boundaries are not affected unless the associated signal is also distorted. Additional information is used in the beginning third of the character to determine if correction is needed. This circuit, known as the inhibit delay trigger, looks for particular peak sequences such as the character described as "SS3". Normally, this character does not need displaced boundaries to separate it from the other 13 characters in the usual font to be recognized. This system according to the present invention is also capable of correcting a peak of the curve just after the fixed time boundary by resetting the associated integrator. This circuit is known as the force integrator TZX extension.

FIG. 3 of the drawings shows a single gap magnetic ink character recognition system similar to that shown in FIG. 1, but including the adaptive timing circuits which comprise the present invention. This showing is in a broad schematic form and is used to illustrate the manner in which the adaptive timing circuits are included in the recognition circuit of the type already known in the art. It can be seen that the adaptive timing circuits 39 are essentially introduced between the timing control oscillator 13 and the remainder of the recognition system. The control line to the integrator resets, 17 as well the lines 31 and 33 to the peak signal and time zone detectors now emanate from the adaptive timing circuits 39 rather than from the timing control 13. Also, the adaptive timing control utilizes a full wave rectified signal plus peak levels supplied from the detector circuits 29 and utilizes an input in the timing circuits 39. The output of peak detector 11 is supplied to the timing circuits 39 via the timing control oscillator 13 as in the arrangement shown in FIG. 1.

FIGS. 4A, 4B, 4C, and 4D are diagrammatic views of waveforms encountered at various points in the system, illustrating the manner in which the adaptive timing circuits operate.

Figure 4A:
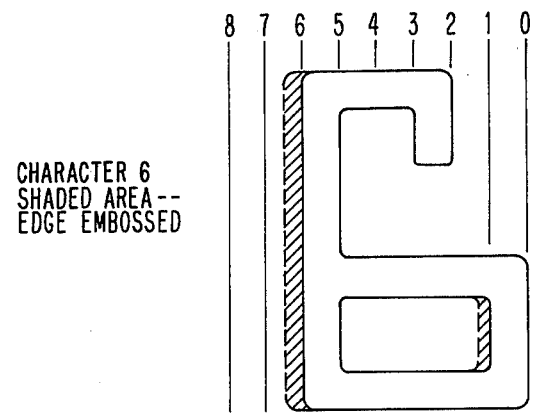
FIGS. 4A–4D illustrates the waveforms encountered in the system of FIG. 3 when scanning a defective character as shown in FIG. 4A.

FIG. 4A shows a character "6" in which the shaded area shows an embossed portion which represents defective printing and which in the usual instance would cause a mistaken reading by prior known systems.

Figure 4B:
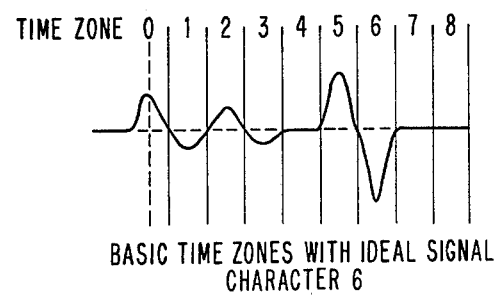

FIG. 4B shows a waveform of the induced MICR signal resulting from scanning an idealized character 6, illustrating the relationships of the various portions of the scan signal with the basic time zones designated 0 through 8 as manifest from the drawing.

Figure 4C:
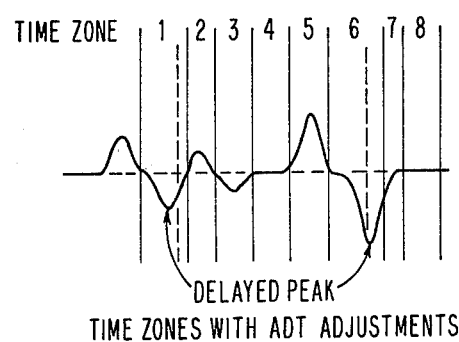

FIG. 4C shows the time zones as adjusted by the adaptive timing system, with the delayed peaks shown in their relationship to the time zones 1 and 6.

Figure 4D:
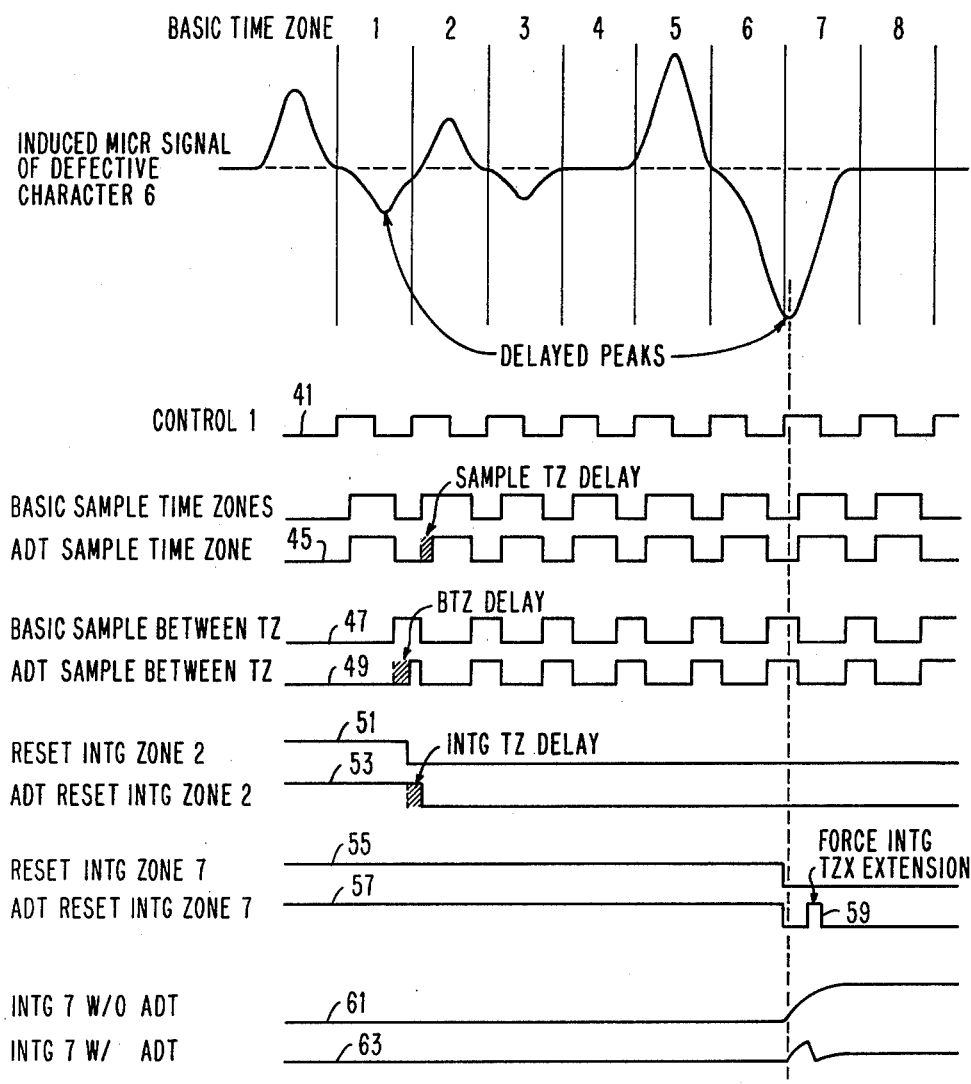

FIG. 4D shows the relationship between the induced MICR signals resulting from scanning a defective character 6 such as shown in FIG. 4A, and the relationship of that waveform to the various signals developed in the system utilizing the adaptive timing arrangement. Note that the two negative going peaks in time zones 1 and 7 are displaced from their normal position.

The waveform designated as Control 1, reference character 41, is a square wave having equal on and off times and extending over the duration of the basic time zone, such as, for example, the time zone TZ1. Next, there is shown the waveform for the basic sample time zones and the sample time zone signals 45 when the adaptive timing system is provided. It will be noted that a delay time is added to the off time of the first cycle, as designated in the drawing by the legend "sample TZ delay."

The next pair of waveforms are the signals described as sample between TZ, and comprised of waveforms 47 and 49. Again, it will be noted that the sample between time zone signal is altered by the amount of the delay designated by the legend BTZ Delay and shown in the drawing.

The next pair of waveforms are the resetting signals for zone 2, designated by reference characters 51 and 53 in which the reset signal is delayed by an amount indicated by the legend INTG TZ Delay as shown in the drawing. The next pair of signals are the reset integrator signals for zone 7, designated by reference characters 55 and 57. Note that an output pulse 59 is provided on the waveform 57, and is designated as Force INTG TZX Extension. The waveforms 61 and 63 show the signals generated by the integrator for time zone 7 without and with the adaptive timing system respectively. It can be seen that the integrated curve 63 is reset by the additional pulse 59 shown in the waveform 57.

Figure 5:
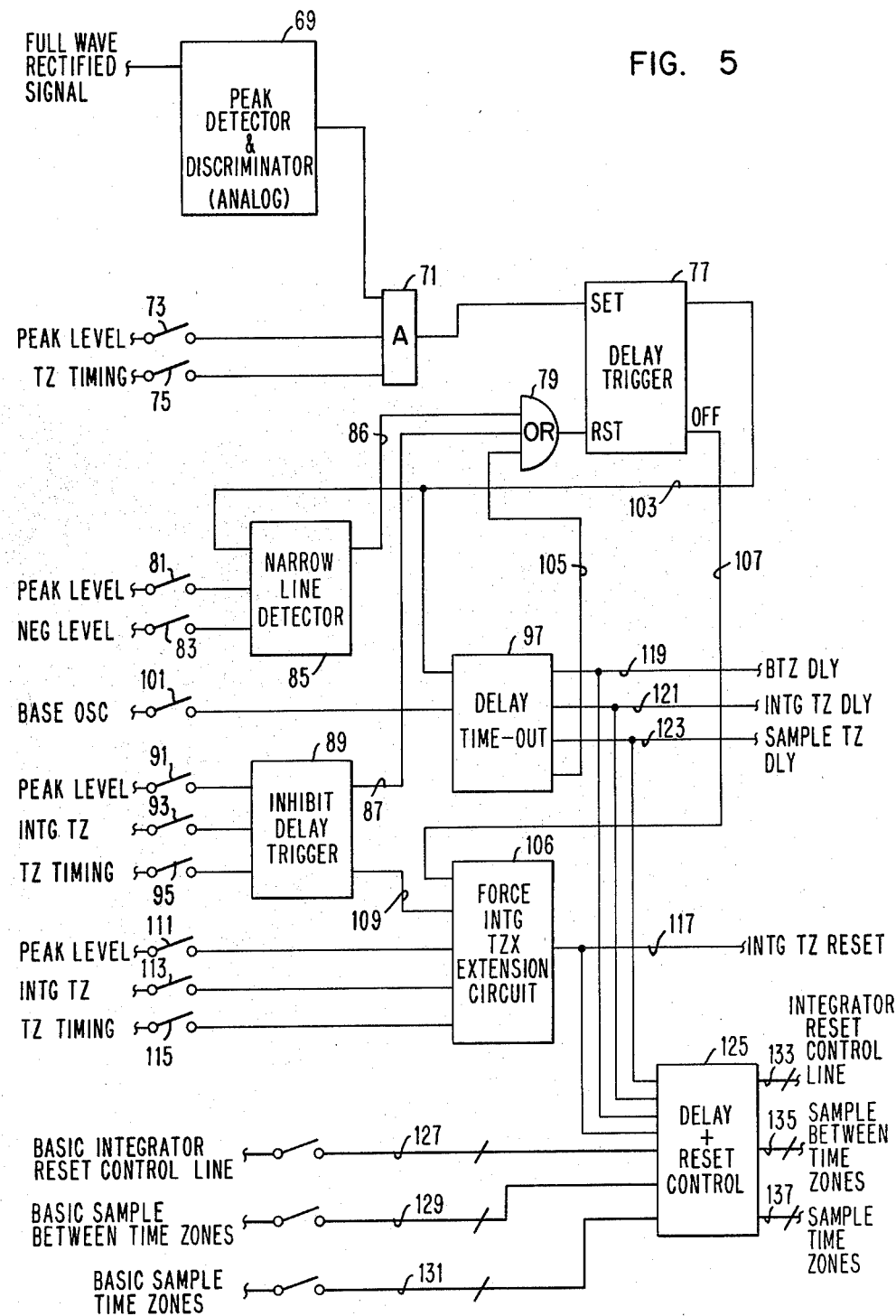
FIG. 5 is a schematic block diagram showing the circuitry of the adaptive timing system in greater detail.

FIG. 5 is a more detailed schematic block diagram of the adaptive timing circuits shown generally by the block 39 of FIG. 3. The input signals are mainly supplied from the system clock or oscillator 13 of FIG. 3, and to simplify the drawing, the source of each signal is indicated on the drawing as conventional manually operated switches, rather than the logical circuits which would be actually employed. Suffice it to say that when the switches shown are closed the signals indicated by the accompanying legend are supplied as inputs to the circuit elements shown in the drawings.

The amplified analog signals are full-wave rectified and supplied to the peak detection and discriminator circuit 69, and are supplied as one input to an AND circuit 71. A second input to this AND circuit is a peak level signal controlled by switch 73, and a third input is supplied via a switch 75, and comprises the timing signals for the 8 time zones, designated by the legent TZ timing. The output of the circuit 71 constitutes the set input for a delay trigger 77. This trigger sets the delay timing into operation. This trigger is reset by terminating conditions which result in a reset signal being supplied from an OR circuit 79. The first criteria for resetting the trigger 77 is detection of a narrow line in the character. Switches 81 and 83 control the positive and negative level inputs to a narrow line detector 85, which is also rendered effective by an "on" output from trigger 77, on line 103. The output of detector 85 on line 86 comprises one input to OR circuit 79. A second resetting circuit is provided by the inhibit delay trigger output on a line 87. Inputs to trigger 89 are governed by switches 91, 93 and 95, governing the supply of signals "peak level", "Intg TZ", and "TZ Timing" respectively. The remaining reset signal to trigger 77 is supplied by the delay time-out element 97. This element which may comprise, for example, an appropriate counter or cascaded single-shot multivibrator provides a plurality of timed output pulses at intervals determined by signals from the base oscillator, governed by switch 101. The delay time-out cycle is initiated by a signal on the output line 103 of trigger 77 and the final time-out signal on line 105 is supplied to OR circuit 79, to thereby reset trigger 77.

The Force Integrator TZX Extension Circuit 106 combines off signals from the delay trigger 77, on line 107 and the inhibit delay trigger 89, on line 109. Also supplied to this circuit, via switches 111, 113, and 115 are the signals peak level, INTG TZ signals and TZ timing signals, as shown. These signals are combined by the logic in element 106 to provide an output on line 117, designated INTG TZ RST, that is, "Integrator Time Zone Reset". This signal along with the outputs from the delay time-out 97, designated as BTZ DLY, INTG TZ DLY and Sample TZ DLY, on lines 119, 121 and 123, are supplied as control inputs to the Delay and Reset Control 125. This combination of logic circuits interposes delays in the basic timing signals supplied from the system clock, i.e. the integrator reset control, the sample time between zones, and the sample time zones on multiple lines 127, 129, and 131, and supplies the delayed signals on the lines 133, 135, and 137. These signals affect the delay operations illustrated in FIGS. 4B-4D.

If a peak is located in the second half of the time zone and none of the inhibit delay conditions is met within the character, the delay trigger latch is set to drive the delay time-out counter at the speed of the base oscillator frequency rate. This delay time-out counter determines the amount of time delay on the between TZ sampling pulses, on the sample TZ sampling pulses, as well as on the extension of the Intg Zne X reset. An example of how these important sampling pulses and integrator resets get changed on embossed character 6 with the MICR adaptive timing system, is shown in FIG. 4.

The delays will be terminated as soon as the delay time-out expires or when a "narrow line condition" is detected and the induced MICR signal swings across the reference level.

The "Force Intg TZx Extension" circuit looks for a very strong negative peak, which is within the first division of the six segments of the TZX+1, together with the previous information that also indicates it is a possible delayed peak. This forces a TZx+1 integrator reset pulse at the third division of the six segments of TZx+1 to remove the energy which has already been accumulated from integrator TZx+1. It is essentially the same as extending TZx boundary ½ time zone further for the peak of that character to the integrating and correlating networks. An example of how the "Force Intg TZx Extension" circuit works on a distorted signal of character six is shown in FIG. 4 by generating an extra reset pulse for Intg Zne 7 to remove the incorrect energy away from Intg 7.

The "inhibit delay trigger" circuit is designed to differentitate the narrow line SS3 character from the rest. It is looking for certain conditions between the TZ2 and TZ3 boundary. When the conditions are met, the adaptive timing logic will be disabled.

While the invention has been particularly shown and described with reference to a preferred embodiment thereof, it will be understood by those skilled in the art that various changes in form and details may be made without departing from the spirit and scope of the invention.

We claim:

1. A character recognition system comprising, in combination, scanning means for scanning characters to be read, said scanning means providing output signals distinctive for each character, said signals having at least one peak signal having an amplitude and time of occurrence characteristic of the character, peak determining means for determining the magnitude of said peak signal, timing means including a base oscillator and means for deriving a plurality of timing signals from the output of said oscillator, and delay means connected to said timing means for delaying said timing signals by predetermined amounts, said delay means being governed by said peak determining means and including a delay control trigger connected to said peak determining means, and to a plurality of delay timing circuits for governing the generation of said delayed timing signals, inhibiting means for inhibiting said delay control trigger when the scanning output signals indicate the scanning of predetermined characters, and circuit means for supplying the delayed signals to said system.

2. A character recognition system as claimed in claim 1 further including a plurality of integrator circuits for integrating said output signals over each of a corresponding plurality of time zones, reset means for resetting said integrators, reset control means for varying the resetting time of said integrators, said reset control means being governed by said delay control trigger to effectively delay said reset time only when said delay control trigger is ineffective to govern said delay timing circuits.

3. A character recognition system as claimed in claim 2, in which said reset control means additionally governs said delay timing circuits.

* * * * *